Jan. 20, 1942.                J. OSWALD                 2,270,550
                COMBINED STEERING WHEEL AND HORN RING
                        Filed Dec. 12, 1940
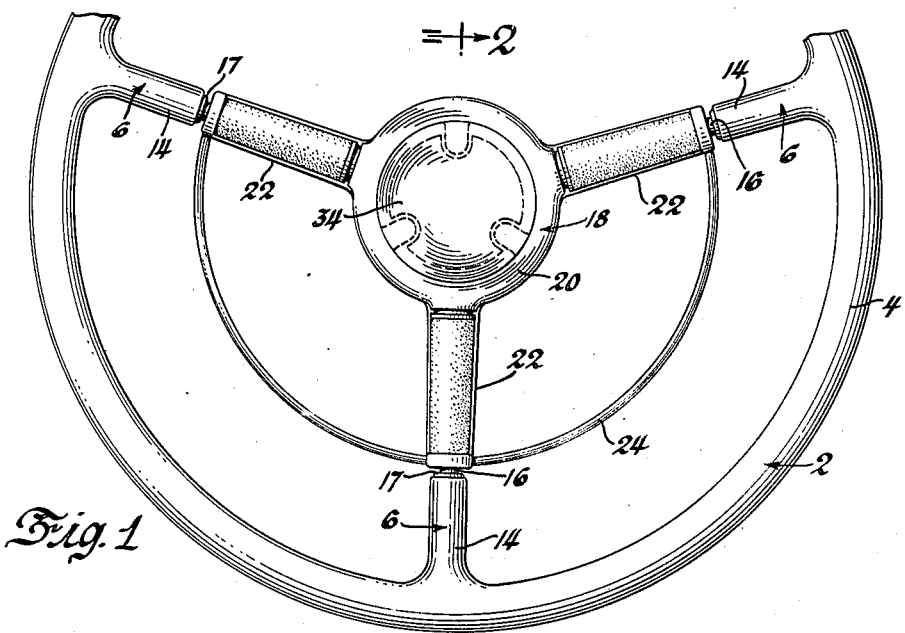
Fig. 1
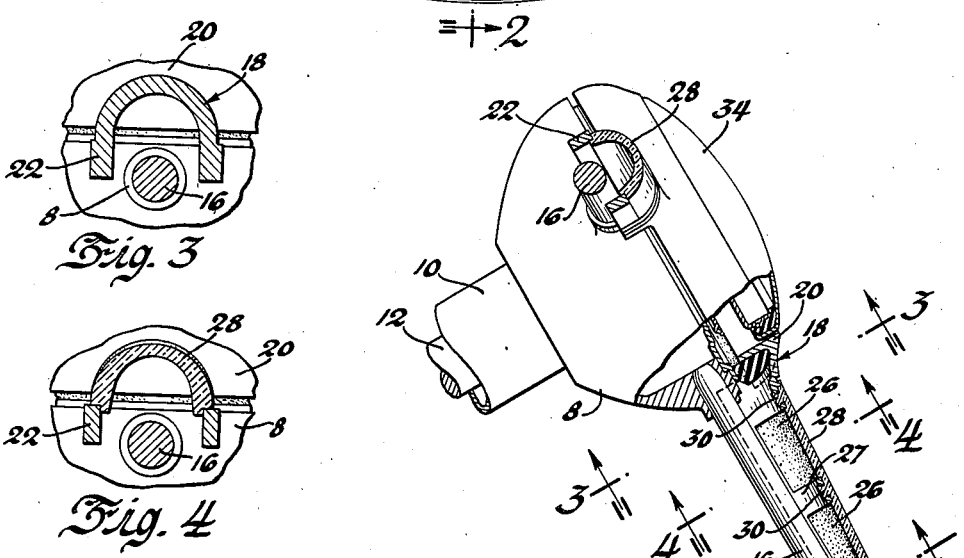
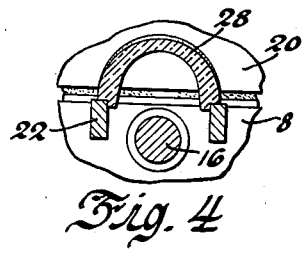
Fig. 3
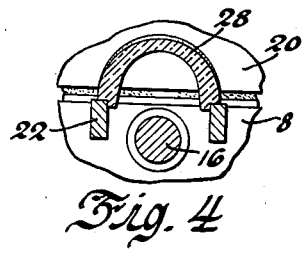
Fig. 4
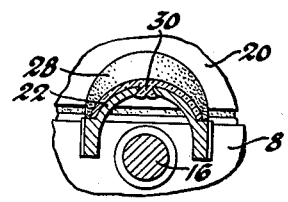
Fig. 5
Fig. 2
Inventor
John Oswald
By Blackmore, Spencer & Hunt
Attorneys Patented Jan. 20, 1942

2,270,550

UNITED STATES PATENT OFFICE 2,270,550

COMBINED STEERING WHEEL AND HORN RING

John Oswald, Lansing, Mich., assignor to General Motors Corporation, Detroit, Mich., a corporation of Delaware Application December 12, 1940, Serial No. 369,827

2 Claims. (Cl. 74—484)

This invention relates to a combined steering wheel and horn sounder ring applied to automotive vehicles.

In modern automotive vehicle practice it is the custom to apply a horn sounder ring to the steering wheel of the vehicle, and this is usually done by providing a secondary and smaller ring inside the steering wheel and mounted over the wheel and usually with the spokes of the horn sounder ring parallel with and overlying the spokes of the steering wheel. This brought about two sets of spokes which offered additional surfaces on which to catch the clothing of the driver. With a view to eliminating as many projecting parts as possible, the assembly of the steering wheel and horn ring sounder was redesigned so that the spokes of the horn sounding ring are still positioned over the steering wheel spokes but cover the same so that there appears to be but a single row of spokes.

In accomplishing the invention, the steering wheel spokes at their inner part are preferably made smaller or of a less cross-sectional diameter than the part immediately adjacent the steering wheel. The spokes of the horn sounder ring are then positioned over the smaller part, and by making these spokes U-shaped in cross section they are able to telescope over the smaller part of the wheel spokes and appear to be a continuation of the wider part of the spoke.

On the drawing

Figure 1 is a plan view of the invention showing the horn sounder ring and steering wheel in the assembled relation.

Figure 2 is a section on the line 2—2 of Figure 1.

Figures 3, 4, and 5 are sections on the corresponding lines of Figure 2.

Referring to the drawing, the steering wheel is indicated as a whole at 2. This wheel has the rim 4, the spokes 6, and the hub 8 to which the spokes are attached. The hub 8 is mounted around the usual steering mast 10 and is secured in the usual way to the usual tube 12 for steering the vehicle.

The spokes 6 have an outer part 14 which is larger or of a greater diameter than the inner part 16, the two parts meeting at the joint at 17.

The horn sounder ring is indicated as a whole at 18 and comprises the inner or hub ring part 20, the spokes 22, and the outer or operating ring 24. The spokes 22 are U-shaped in cross section. The inner and outer rings 20 and 24 and the spokes 22 are preferably of metal, and intermediate the rings the spokes are cut away as indicated at 26, but with a bridge 27 at the middle. The cut-away part 26 of the spokes is covered by the decorative member 28 which may be made of a suitable plastic or any other material. The member 28 is U-shaped in cross section and is secured to the spokes 22 by means of connections shown at 30.

The outer part of the ring 24 has the inwardly bent flange 32 which terminates just beyond the junction between the larger and smaller parts 14 and 16 of wheel spokes 6.

As is seen in Figures 3, 4, and 5, the spokes 22 and their covers 28 are U-shaped in cross section and fit over the smaller part 16 of the steering wheel spoke 6. The legs of the U-shaped part project on both sides of the spokes 16 and conceal the same. As shown in Figures 3, 4, and 5, the legs of the U extend a little beyond the center line of the spoke part 16, but if desired the legs may extend downwardly to beyond the lower part of the spokes completely to conceal them from the sides.

The inner ring 20 is preferably hollow or has a depression therein and has fitted thereto the button 34 to simulate the usual horn sounder button and to provide a place for placing the automobile insignia or trademark.

In the operation of the device the depression of the spokes 22 or the ring 24 of the horn sounder ring 18 will enable the usual electric contact to be made to cause the horn to sound. There is sufficient space between the top of the spokes 16 and the horn sounder ring to allow a travel of the ring 24 sufficient to make the contact.

I claim:

1. In a combined steering wheel and horn sounder ring, a plurality of spokes on the wheel, a plurality of spokes on the horn ring, said horn ring spokes being U-shaped in cross section and overlying the wheel spokes and extending on both sides thereof, the plane of the undersides of the legs of the U passing through the spokes of the wheel and concealing the same laterally for a part of their length.

2. In a combined steering wheel and horn sounder ring, a plurality of spokes on the wheel, said spokes being smaller at their inner ends, a plurality of spokes on the horn ring, said horn ring spokes being U-shaped in cross section and overlying the wheel spokes and extending on both sides thereof and concealing the same for a part of their length, said horn ring spokes extending over the smaller part of the wheel spokes and terminating at the joint where the wheel spokes become larger.

JOHN OSWALD.